United States Patent [19]
Gounder

[11] Patent Number: 5,255,507
[45] Date of Patent: Oct. 26, 1993

[54] COMBINED CYCLE POWER PLANT INCORPORATING ATMOSPHERIC CIRCULATING FLUIDIZED BED BOILER AND GASIFIER

[75] Inventor: Ponnusami K. Gounder, San Diego, Calif.

[73] Assignee: Ahlstrom Pyropower Corporation, San Diego, Calif.

[21] Appl. No.: 877,808

[22] Filed: May 4, 1992

[51] Int. Cl.$^5$ .............................................. F02C 3/28
[52] U.S. Cl. ................................. 60/39.12; 60/39.182; 60/39.511
[58] Field of Search ............ 60/39.12, 39.182, 39.463, 60/39.465, 39.511

[56] References Cited

U.S. PATENT DOCUMENTS

| | | | |
|---|---|---|---|
| 3,444,012 | 5/1969 | Foster-Pegg ........................ | 60/39.12 |
| 3,871,172 | 3/1975 | Villiers-Fisher et al. ........... | 60/39.12 |
| 4,387,560 | 6/1983 | Hamilton et al. ................... | 60/39.02 |
| 4,470,255 | 9/1984 | Rowlands et al. .................. | 60/39.12 |
| 4,476,674 | 10/1984 | Berman .............................. | 60/39.182 |
| 4,845,942 | 7/1989 | Schemenau et al. ............... | 60/39.12 |

OTHER PUBLICATIONS

James D. McClung, "Clean, Cost-Effective Kilowatts from Coal", ASEA Babcock, Technical Paper, 1988 Seminar on Fluidized-Bed Combustion Technology for Utility Applications, May 3–5, 1988, Hyatt Rickeys, Palo Alto, Calif.
A. J. Scalzo et al., "An Overview of Westinghouse Coal-Fueled Combustion Trubine Programs", American Power Conference 53rd Annual Meeting, Chicago, Ill., Apr. 29–May 1, 1991, Westinghouse Electric Corporation, Power Generation Business Unit, Orlando, Fla.
Krishna K. Pillai et al., "Utility Size PFBC Plants", ABB Carbon AB, Finspong, Sweden, ASME 1991, pp. 493–501.
R. A. Bajura et al., "The Marriage of Gas Turbines and Coal", U.S. Department of Energy, Morgantown Energy Technology Center, Morgantown, W. Va., pp. 58–63.

*Primary Examiner*—Louis J. Casaregola
*Attorney, Agent, or Firm*—Baker, Maxham, Jester & Meador

[57] ABSTRACT

A combined cycle power generation system is disclosed. The system includes a fluidized bed boiler, a hot separator, a steam turbine system and a gas turbine system. The gas turbine system is provided with a source of high temperature compressed air heated in three stages by a recuperator connected to an output of the gas turbine, an external bed heater connected to the hot separator, and a gas turbine combustor fueled by natural gas and/or coal gas provided by a gasification process.

6 Claims, 1 Drawing Sheet

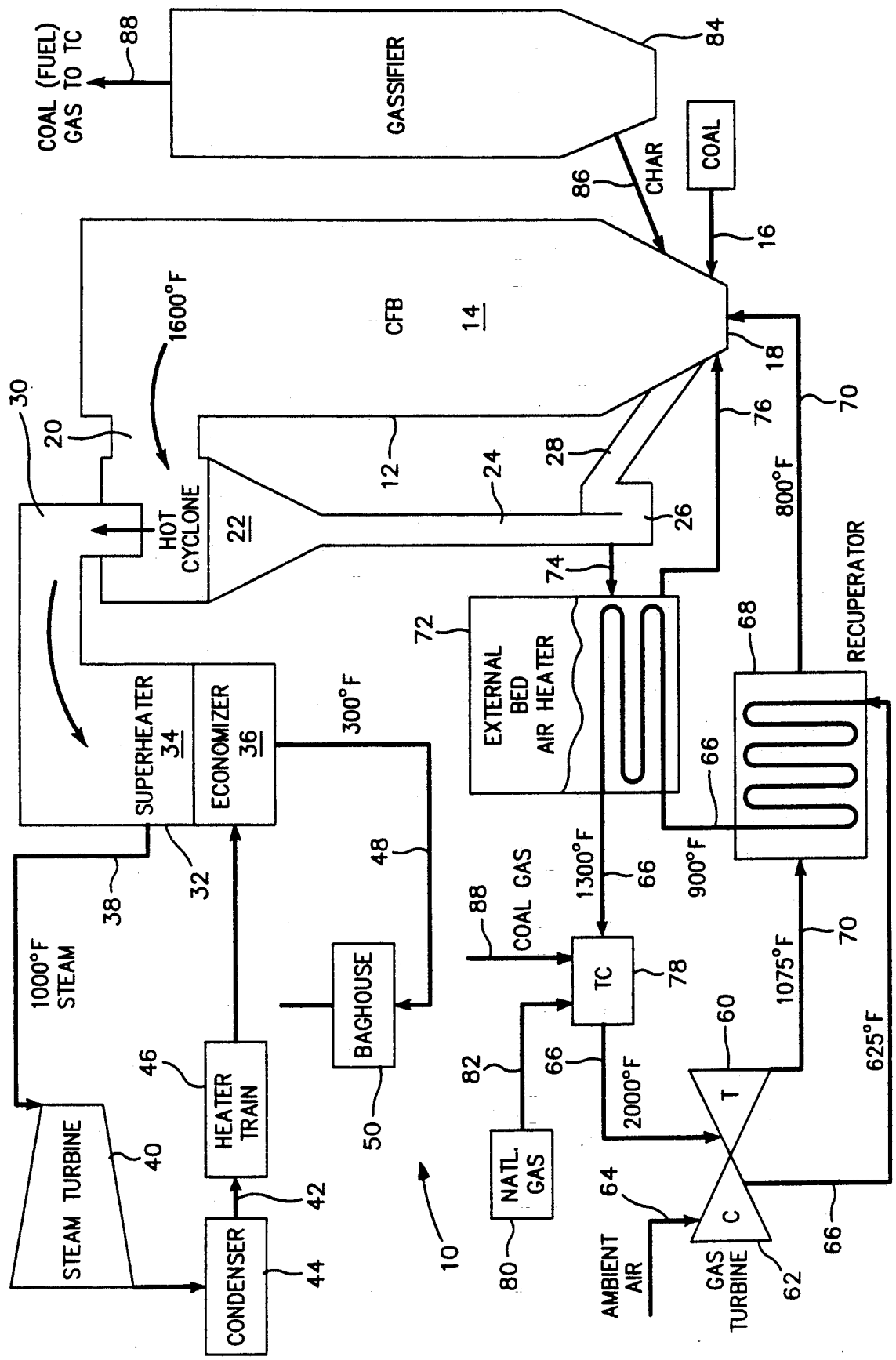

COMBINED CYCLE POWER PLANT INCORPORATING ATMOSPHERIC CIRCULATING FLUIDIZED BED BOILER AND GASIFIER

BACKGROUND OF THE INVENTION

The present invention relates to circulating fluidized bed boilers and pertains particularly to a combined cycle power plant incorporating an atmospheric circulating fluidized bed boiler and gasifier.

Power generation systems combining a gas turbine and steam power plant with a fluidized bed furnace are known. Systems employing second generation pressurized fluidized bed technology have received substantial recent attention. In those systems, a pressurized fluidized bed combustion chamber burns a solid fuel such as coal to power a steam turbine, which in turn drives an electric generator. A gas turbine portion of the power plant is powered by high temperature compressed gas to drive another electric generator for increased power. Heat for the gas turbine system is provided to the gas turbine expansion chamber using gas produced by a gasifier or using natural gas.

In these prior art systems, high temperature filtering is required in the gas line to eliminate combustion particulates. Refractory lined pipes are further required because of the high temperature of the combustion gas. In addition, $NO_x$ reduction efforts are required in the gas turbine cycle.

Accordingly, an improved combined cycle power generation plant which overcomes the foregoing disadvantages would be desirable.

SUMMARY OF THE INVENTION

It is an object of the present invention to provide a combined cycle power generation system using coal fired atmospheric boilers wherein the efficiency of the gas turbine system is greatly improved.

It is a further object of the present invention to provide a combined cycle power generation system wherein high temperature filtering before the gas turbine system is not required.

It is a further object of the present invention to provide a combined cycle power generation system wherein refractory lined pipes between the coal combustor and the gas turbine system are not required.

It is a further object of the present invention to provide a combined cycle power generation system wherein $NO_x$ reduction efforts are not required in the gas turbine cycle.

In accordance with a primary aspect of the present invention, a combined cycle power generation system is provided. The system includes a fluidized bed coal combustor for combusting solid fuels to produce steam and a heated exhaust output. A separator separates particulates from the heated exhaust output and returns the same to the fluidized bed combustor via a return path. A steam turbine is powered by the steam produced in the coal combustor and the heated exhaust while a gas turbine is powered by a compressed air fluid. In the compressed air fluid line, there is placed a recuperator, an external bed heater, and a gas turbine combustor. The recuperator is connected to a compressed air source and an exhaust output of the gas turbine for heating the compressed air to a first temperature prior to input to the gas turbine. The external bed air heater is connected to the recuperator and to the separator return path for heating the compressed air to a second temperature prior to input to the gas turbine. A gas turbine combustor heats the compressed air to a third temperature prior to input to the gas turbine. A fuel source including natural gas and/or coal gas fuel provides power to the gas turbine combustor.

BRIEF DESCRIPTION OF THE DRAWING

The drawing presents a schematic diagram illustrating a combined cycle power generation system constructed in accordance with the present invention.

DETAILED DESCRIPTION OF THE PREFERRED EMBODIMENT

Referring now to the drawing, a combined cycle power generation plant designated generally by the numeral 10 comprises a preferred embodiment of the present invention. The power plant 10 includes a circulating fluidized bed ("CFB") boiler 12 having a combustion chamber 14 into which combustible material, non-combustible material, possibly additives or recirculated material, primary air and secondary air, are fed. The arrow designated 16 in the drawing indicates a preferred location wherein combustible materials, which are preferably coal or a similar solid fuel, are introduced. In the combustion chamber 14, the bed is maintained in a fluidized state by having the correct inventory of bed material and flow of air. The combustion chamber is provided with a bottom wall 18 through which fluidizing air is introduced. The combustion walls are preferably constructed with membrane type tube walls, with or without a refractory covering as is well known in the art.

The fluidized bed boiler 12 combusts the fuel material to produce a heated exhaust output. Its walls contain water circulation lines (not shown) in which water is heated to produce steam. The heated combustion exhaust output is carried from the combustion chamber 14 by way of flue 20 to a hot cyclone separator 22. In the hot separator 22, the solid particulates are separated from the flue gasses of the heated exhaust output for return via a return path formed by way of flues 24, 26 and 28 to the bottom of combustion chamber 14 for recirculation. These may be passed through fluidized bed coolers or the like prior to return to the combustion chamber.

Flue gasses from the hot separator pass along by way of a flue 30 to a convection pass 32. Superheater sections 34 are placed or located in the convection pass. The superheater 34 is positioned upstream of an economizer 36, and receives steam from the CFB boiler 12. This steam is superheated and directed through a supply line 38 to a steam turbine 40. A return line 42 is provided between the steam turbine 40 and the economizer 36. A conventional condenser 44 and heater train 46 are connected to this return line. The economizer 36 is connected to an exhaust line 48 for directing the hot separator flue gasses to atmosphere through a baghouse filter 50. The steam turbine 40 is preferably connected to an electric generator (not shown) for the production of electric power.

A second electric generator (not shown) is connected to a gas turbine 60 thus providing the second cycle of the combined cycle power plant 10. The gas turbine 60 is operated by high temperature compressed air provided by an air compressor 62. The air compressor 62 receives ambient air from an air inlet line 64. The compressor 62 is operatively connected to and driven by the gas turbine 60. The compressor 62 provides a source of compressed air to a source line 66. As ambient air is compressed, it acquires heat energy and exits the compressor 62 at an elevated temperature. The source line 66 carries the compressed air to a recuperator 68. The recuperator 68 provides heat exchange between the compressed air in the source line 66 and the exhaust output from the turbine 60. This output is provided via turbine exhaust line 70.

Turbine exhaust line 70 is directed through the recuperator 68. In the recuperator, the turbine exhaust gas carried in the turbine exhaust line 70 gives up heat to the compressed air and will decrease in temperature. Following this heat exchange, the turbine exhaust line 70 carries turbine exhaust products to the fluidized bed combustor 12. The compressed air, in turn, gains heat in the recuperator and exits at an elevated temperature. The temperature of the compressed air after its passage to the recuperator will be referred to as a first temperature.

The compressed air at the first temperature is carried along the source line 66 to an external bed air heater 72. The air heater 72 is connected to the hot separator return path formed by the flues 24, 26 and 28. This connection is provided by an air heater inlet line 74 which carries heated particulates into the air heater 72. The air heater 72 is a heat exchanger providing heat exchange between the hot separator particulates and the compressed air in the compressed air source line 66. This elevates the temperature of the compressed air from its first temperature to a second temperature. The air heater 72 returns the hot separator particulates drawn from the line 74 to the fluidized bed 14 via a return line 76. The external bed heater 72 is positioned externally of the fluidized bed combustor and hot separator 22. This avoids construction and corrosion problems that might otherwise occur if the air heater were placed within the fluidized bed combustor 12 or the hot separator 22.

The compressed air heated to its second temperature continues through the source line 66 and is further heated by a gas turbine combustor ("TC") 78. The combustor 78 provides heat energy to the compressed air to elevate its temperature from the second temperature to a third temperature. The gas turbine combustor 78 is a combustion chamber in which a combustible gas is burned. The combustible gas is selectively provided from two sources. The first is a natural gas source 80. The natural gas source 80 provides natural gas to the gas turbine combustion 78 along a natural gas inlet line 82. A second source of combustible gas is provided by a gasifier 84. The gasifier 84 is used to gasify a solid fuel such as coal. The gasifier 84 produces an output of coal gas. Depending on the type of gasifier, char may be produced in the gasifier. The char can be fed to the fluidized bed combustor 12 through an inlet line 86. The coal gas is provided to the gas turbine combustor 78 along a coal gas inlet line 88. The gas turbine combustor 78 may be operated with either natural gas, coal gas, or both.

It will be appreciated that the efficiency of the gas turbine 60 is greatly improved by the provision of compressed air at a very high temperature. The heat energy provided by the recuperator 68 and external bed heater 72 reduce the amount of heat energy required from the gas turbine combustor 78. Concomitantly, this reduces the amount of combustible gas required by the combustor. The gas turbine exhaust is used as the air source for the CFB combustor, which eliminates the need for emission reduction efforts in the gas turbine cycle. Since the gas turbine exhaust is going through the CFB combustor, emission reduction can be taken care of in the CFB. Further, it will be noted that no particulates are introduced within the air stream as it is heated to the first, second and third temperatures. Therefore, the need for high temperature filters is eliminated. Also, the first and second temperatures to which the compressed air is heated are preferably not so high as to require refractory lined pipes. Refractory lined pipes are usually required at temperatures of about 1400° F. and above.

It will also be appreciated that the use of natural gas and coal gas in the gas turbine combustor can be selected depending on prevailing energy costs. Moreover, other fuels such as light or heavy oil could be used in areas where sulfur-containing heavy oil is available at a lower price than natural gas. In such cases, the gas turbine can be readily designed to utilize this oil fuel and the CFB combustor can take care of sulfur removal. Advantageously, virtually any combination of coal gas, natural gas and oil fuels could be used. As a result of improved efficiencies, the system gives an option for utilizing coal with higher cycle efficiencies than is possible by using only one-hundred percent coal in a simple cycle system. In addition, at a third compressed air temperature of about 2000° F., the natural gas/coal gas heat input required is about twenty percent of the total heat input to the combined cycle plant. Instead of using a partial gasifier, a twenty percent capacity full gasifier (100 percent coal gasification) can be used, if natural gas is not the choice.

Accordingly, a novel combined cycle power generation system has been described. While the invention has been illustrated with respect to specific embodiments, it will be understood that numerous changes and modifications could be made thereto. Thus, the scope of the invention should not be limited except in accordance with the spirit of the claims and their equivalents.

I claim:

1. In a combined cycle power generation system, having a fluidized bed boiler for combusting solid fuels to produce steam and a heated exhaust output, a hot separator for separating particulates from the heated exhaust output and returning the particulates to the fluidized bed boiler via a hot separator return path, a steam turbine powered by steam produced in the fluidized bed boiler and a gas turbine powered by heated compressed air, the improvement comprising:

an air compressor for providing a source of compressed air to the gas turbine;

a recuperator connected to said air compressor and to an exhaust output from the gas turbine for heating the compressed air to a first temperature prior to input to the gas turbine;

an external bed air heater connected to said recuperator and to the hot separator return path for heating the compressed air fluid to a second temperature prior to input to the gas turbine; a gas turbine combustor connected to said external bed air heater and to the gas turbine for heating the compressed air to a third temperature prior to input to the gas turbine;

a first fuel source including natural gas connected to the gas turbine combustor for providing fuel to the gas turbine combustor; and a second fuel source including coal gas fuel connected to the gas turbine combustor for providing fuel to the gas turbine combustor.

2. The power generation system of claim 1 wherein said first and second fuel sources selectively provide natural gas and coal gas fuel to the gas turbine combustor.

3. The power generation system of claim 1 wherein said second fuel source includes a gasifier for producing coal gas from solid fuel.

4. The power generation system of claim 3 wherein said gasifier provides a coal gas output to the gas turbine combustor and a char output to the fluidized bed boiler.

5. The power generation system of claim 1 wherein said external bed air heater returns cooled particulates to the fluidized bed boiler.

6. The power generation system of claim 1 wherein said recuperator returns cooled gas turbine exhaust to the fluidized bed boiler.

* * * * *